United States Patent
Pinarbasi

(10) Patent No.: US 7,061,728 B2
(45) Date of Patent: Jun. 13, 2006

(54) HIGH LINEAR DENSITY READ HEAD WITH A CONTIGUOUS JUNCTION AND MINIMAL SHIELD SHORTS

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 167 days.

(21) Appl. No.: 10/629,942

(22) Filed: Jul. 29, 2003

(65) Prior Publication Data

US 2005/0024780 A1    Feb. 3, 2005

(51) Int. Cl.
*G11B 5/33* (2006.01)
*G11B 5/39* (2006.01)

(52) U.S. Cl. .................................................. 360/320
(58) Field of Classification Search ............... 360/320, 360/319, 317, 313, 110
See application file for complete search history.

(56) References Cited

U.S. PATENT DOCUMENTS

| | | | | |
|---|---|---|---|---|
| 4,918,554 A | 4/1990 | Bajorek et al. | ............. | 360/319 |
| 5,568,335 A | 10/1996 | Fontana et al. | ............. | 360/320 |
| 5,617,277 A | 4/1997 | Chen et al. | ................. | 360/320 |
| 5,897,969 A * | 4/1999 | Taniyama et al. | ........... | 428/833 |
| 6,162,305 A | 12/2000 | Hsiao et al. | ................ | 148/280 |
| 6,162,582 A | 12/2000 | Hsiao et al. | ................ | 430/312 |
| 6,185,078 B1 | 2/2001 | Lin et al. | ................ | 360/324.12 |
| 6,198,608 B1 | 3/2001 | Hong et al. | .................. | 360/320 |
| 6,262,869 B1 | 7/2001 | Lin et al. | ................ | 360/324.11 |
| 6,315,875 B1 | 11/2001 | Sasaki | .................... | 204/192.34 |
| 6,493,926 B1 | 12/2002 | Han et al. | ................ | 29/603.14 |
| 6,496,334 B1 | 12/2002 | Pang et al. | .................. | 360/319 |
| 6,504,687 B1 | 1/2003 | Miyatake et al. | ........... | 360/319 |

* cited by examiner

*Primary Examiner*—Julie Anne Watko
(74) *Attorney, Agent, or Firm*—Ervin F. Johnston; Matthew S. Zises

(57) ABSTRACT

In a magnetic head a read sensor is located between first and second read gap layers wherein the first read gap layer includes a read gap material layer and first and second refill gap layers. The read gap material layer has first and second depressions which extend laterally from the first and second side walls respectively of the sensor and the first and second refill gap layers are disposed in the first and second depressions and engage a bottom portion of the first side wall and engage a bottom portion of the second side wall respectively. The first read gap layer has first and second portions which extend laterally from the first and second side walls of the sensor and a third portion which engages a bottom surface of the sensor and is located between said first and second portions with each of said first and second portions having a thickness which is greater than a thickness of said third portion. A first lead layer is electrically connected to a top portion of the first side wall and a second lead layer is electrically connected to a top portion of the second side wall.

3 Claims, 6 Drawing Sheets

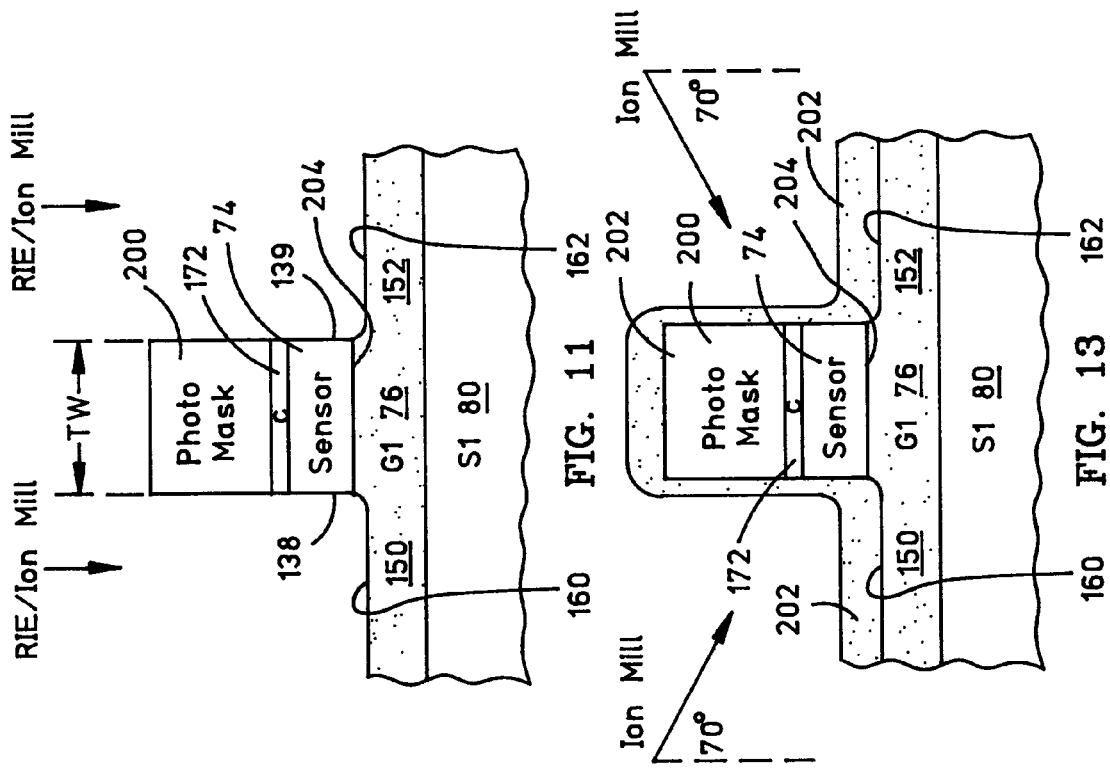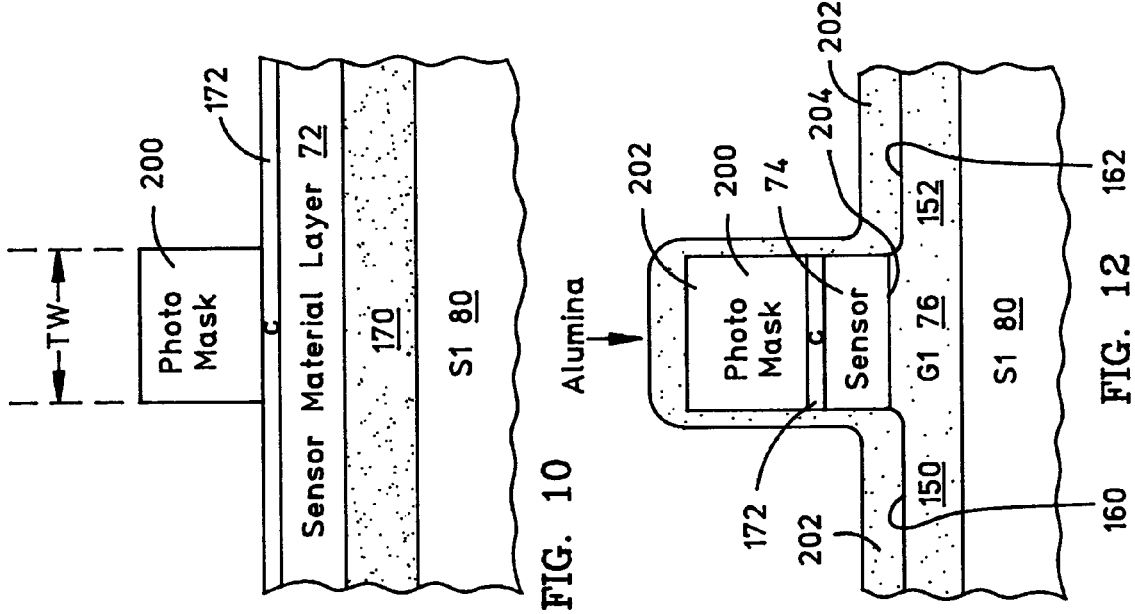

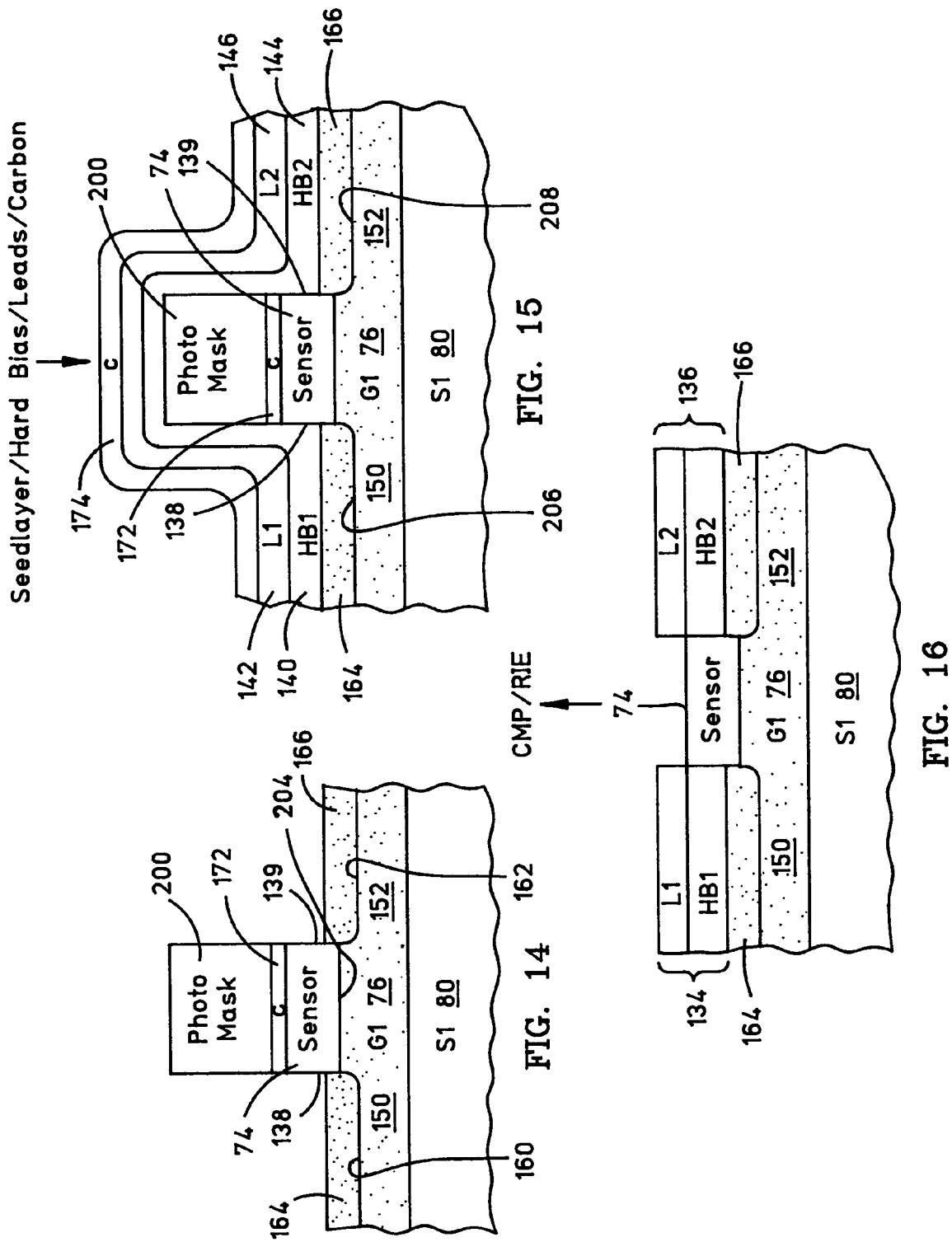

HIGH LINEAR DENSITY READ HEAD WITH A CONTIGUOUS JUNCTION AND MINIMAL SHIELD SHORTS

BACKGROUND OF THE INVENTION

1. Field of the Invention

The present invention relates to a method of reducing shield shorts in a high linear density read head with a contiguous junction and, more particularly, to such a method wherein a first read gap layer is refilled after being overmilled and side walls of a sensor are cleaned before making a contiguous junction.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. When the disk is not rotating the actuator arm parks the suspension arm and slider on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. The ABS is an exposed surface of the slider and the write and read heads that face the rotating disk. When the slider rides on the air bearing, the actuator arm positions the write and read heads over the selected circular tracks on the rotating disk where signal fields are written and read by the write and read heads. The read and write heads are connected to processing circuitry that operates according to a computer program to implement the writing and reading functions.

An exemplary high performance read head employs a giant magnetoresistance (GMR) read sensor for sensing magnetic signal fields from the rotating magnetic disk. The GMR read sensor comprises a nonmagnetic electrically conductive spacer layer that is sandwiched between a ferromagnetic pinned layer and a ferromagnetic free or sense layer. An antiferromagnetic pinning layer typically interfaces the pinned layer for pinning the magnetization of the pinned layer 90° to an air bearing surface (ABS) of the read sensor wherein the ABS of the read sensor is an exposed surface of the read sensor that faces the rotating disk. First and second hard bias and lead layers are typically connected to the read sensor for conducting a sense current therethrough. The magnetization of the free layer is free to rotate upwardly and downwardly with respect to the ABS from a quiescent or zero bias point position in response to positive and negative signal fields respectively from the rotating magnetic disk. The quiescent position of the magnetization of the free layer, which is parallel to the ABS, is when the sense current is conducted through the read sensor without signal fields from the rotating magnetic disk.

When a sense current is conducted through the read sensor, electrical resistance changes of the sensor cause potential changes that are detected and processed as playback signals by processing circuitry. The sensitivity of the read sensor is quantified by a giant magnetoresistance (GMR) coefficient $\Delta R/R$ where $\Delta R$ is the change in resistance of the read sensor from minimum resistance (when magnetizations of free and pinned layers are parallel to each other) to maximum resistance (when magnetizations of the free and pinned layers are antiparallel to each other) and R is the resistance of the read sensor at minimum resistance.

First and second hard bias and lead layers are typically connected to first and second side surfaces of the read sensor, which connection is known in the art as a contiguous junction. This junction is described in commonly assigned U.S. Pat. No. 5,018,037 which is incorporated by reference herein. The first and second hard bias layers longitudinally stabilize the magnetization of the free layer of the GMR sensor in a single domain state which is important for proper operation of the GMR sensor.

A read head is rated by its areal density which is a product of its track width density and its linear bit density. The track width density is quantified as the number of tracks per inch (TPI) along a radius of the disk while the linear bit density is quantified as the number of bits per linear inch (BPI) along the track of the disk. The track width density is dependent upon the width of the sensor at the ABS while the linear density is dependent upon the spacing between the first and second shield layers. In a typical read head the sensor is located between nonmagnetic electrically insulative first and second read gap layers which are, in turn, located between the first and second shield layers. Consequently, it is important to minimize thicknesses of the first and second read gap layers so as to reduce the read gap between the first and second shield layers. A typical material for the first and second read gap layers is aluminum oxide ($Al_2O_3$). Unfortunately, when the read gap layers are made too thin pinholes in these layers cause electrical shorts between the shield layers and the first and second lead layers. For instance, if the first read gap layer has a pinhole this will cause a short between the first shield layer and one of the first and second lead layers to the sensor. This can be overcome by making the first read gap layer sufficiently thick so that a pinhole does not extend through the thickness of the layer. Making the aforementioned contiguous junction can present a problem in maintaining the first read gap layer with an optimized reduced thickness that is free of pinholes.

In the making of the read head the first read gap layer is sputter deposited on the first shield layer, a sensor material layer is formed on the first read gap layer, a mask with a desired track width is formed on the sensor material layer and exposed portions of the sensor material layer are milled to form a sensor with first and second side walls that are spaced apart by the track width. In order to ensure that all portions of the sensor material layer extending laterally from the first and second side walls of the sensor are removed, it is necessary to overmill into the first read gap layer. This causes the first read gap layer to have first and second depressions which extend laterally from the first and second side walls of the sensor. The first and second hard bias and lead layers are then formed in these depressions and electrically connected to the first and second side walls of the sensor. Unfortunately, the reduced thickness of the first read gap layer presents a high risk that there will be a shield short between the first shield layer and one of the first and second hard bias and lead layers. If the first read gap layer is formed with a sufficient thickness so that the overmilling does not cause a risk of pinholes, this increased thickness reduces the linear bit read density of the read head. There is a strong-felt need to maintain an optimized narrow first read gap layer without the risk of pinholes while ensuring the removal of the sensor material layer extending laterally from the first and second side walls of the sensor and making a contiguous junction that has high electrical contact between the side walls of the sensor and the first and second hard bias and lead layers.

SUMMARY OF THE INVENTION

In the present method, a read gap material layer with a desired read gap thickness is formed on the first shield layer, the sensor material layer is formed on the read gap material layer, the mask with the track width is formed on the sensor material layer, exposed portions of the sensor material layer are milled to form a sensor with the first and second side walls which are spaced apart by the track width, milling is continued into first and second read gap material layers which extend laterally from the first and second side walls of the sensor to ensure the removal of unwanted portions of the sensor material layer on each side of the side walls, which milling causes the first and second read gap material layers to have first and second depressions which extend laterally from the first and second side walls, nonmagnetic electrically insulative first and second refill gap layers are sputter deposited into the first and second depressions, which refill gap material is also deposited on the first and second side walls of the sensor, high angle milling of portions of the first and second refill gap layers on the first and second side walls is undertaken until at least a portion of each of the first and second side walls is exposed and the first and second hard bias and lead layers are electrically connected to the first and second side walls. The invention also includes the read head made in accordance with the method described hereinabove.

Other aspects of the invention will be appreciated upon reading the following description taken together with the accompanying drawings wherein the various figures are not to scale with respect to one another nor with respect to the structure shown therein.

BRIEF DESCRIPTION OF THE DRAWINGS

FIG. 10 is an ABS illustration of the first steps in constructing the read head wherein the first read gap layer (G1), the sensor material layer, a carbon layer and a photomask has been formed;

FIG. 11 is the same as FIG. 10 except ion milling has been implemented to remove exposed portions of the sensor material layer which milling causes depressions in the first read gap layer;

FIG. 12 is the same as FIG. 11 except a thick layer of alumina has been deposited;

FIG. 13 is the same as FIG. 12 except ion milling has been commenced for removing the alumina from the side walls of the sensor;

FIG. 14 is the same as FIG. 13 except the alumina has been removed from the side walls of the sensor by the ion milling;

FIG. 15 is the same as FIG. 14 except seed, hard bias, lead and carbon layers have been deposited; and FIG. 16 is the same as FIG. 15 except the photomask has been removed.

DESCRIPTION OF THE PREFERRED EMBODIMENTS

Magnetic Disk Drive

Figure 1:
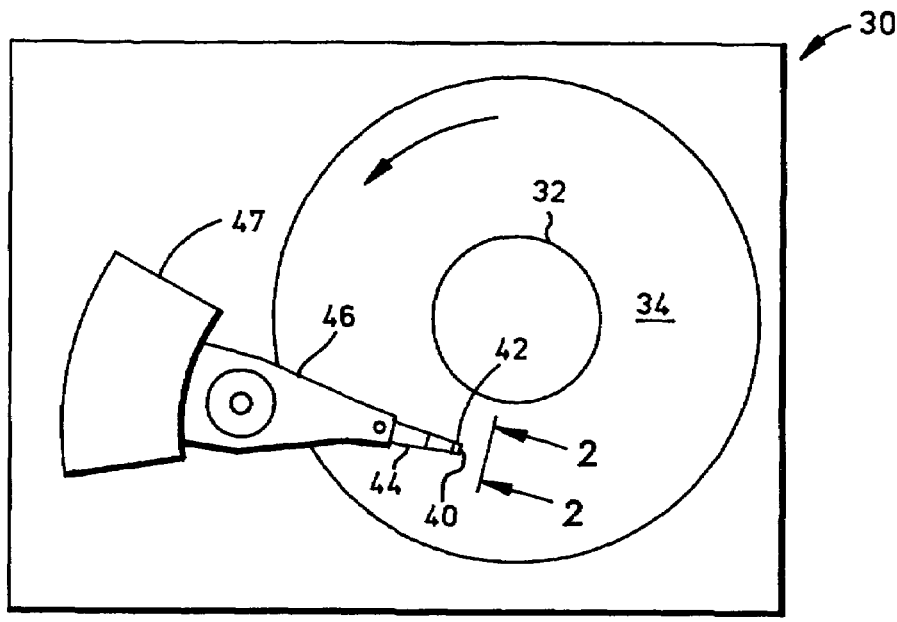
FIG. 1 is a plan view of an exemplary prior art magnetic disk drive.
Figure 2:
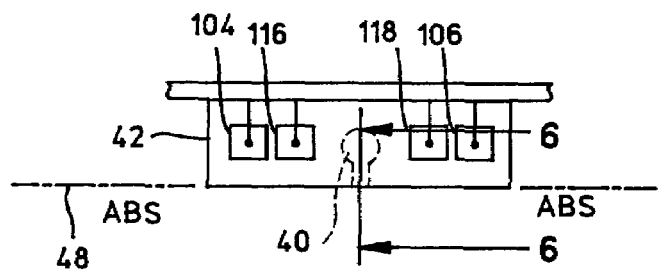
FIG. 2 is an end view of a slider with a magnetic head assembly of the disk drive as seen in plane 2—2 of FIG. 1.
Figure 3:
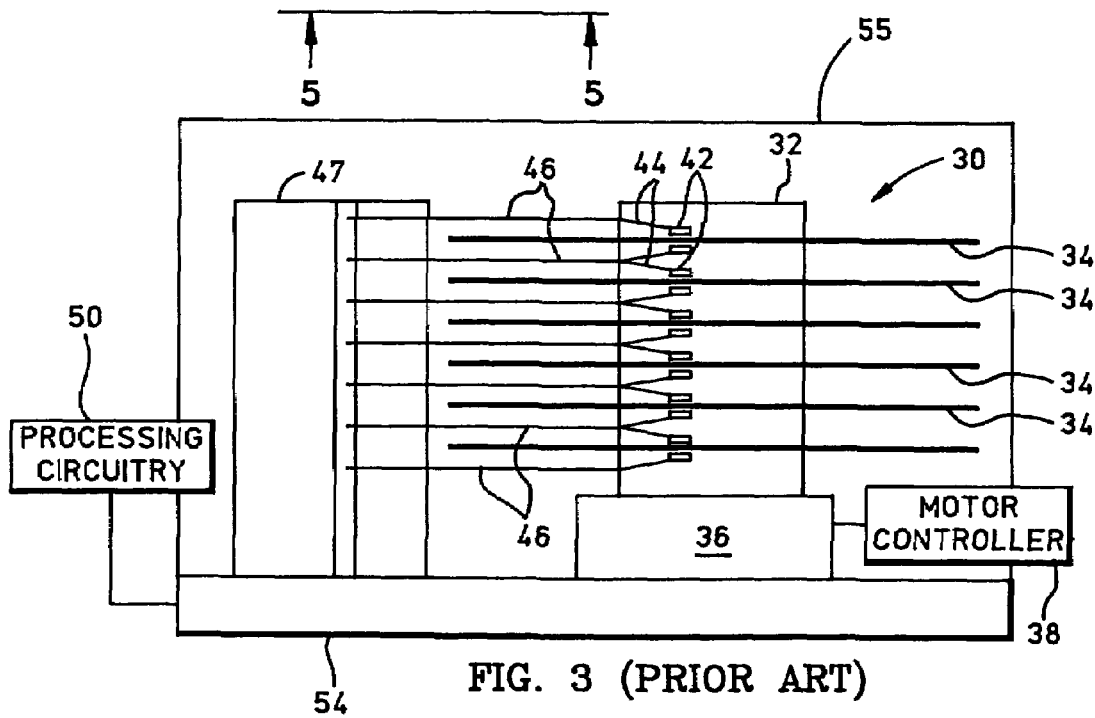
FIG. 3 is an elevation view of the magnetic disk drive wherein multiple disks and magnetic head assemblies are employed.
Figure 4:
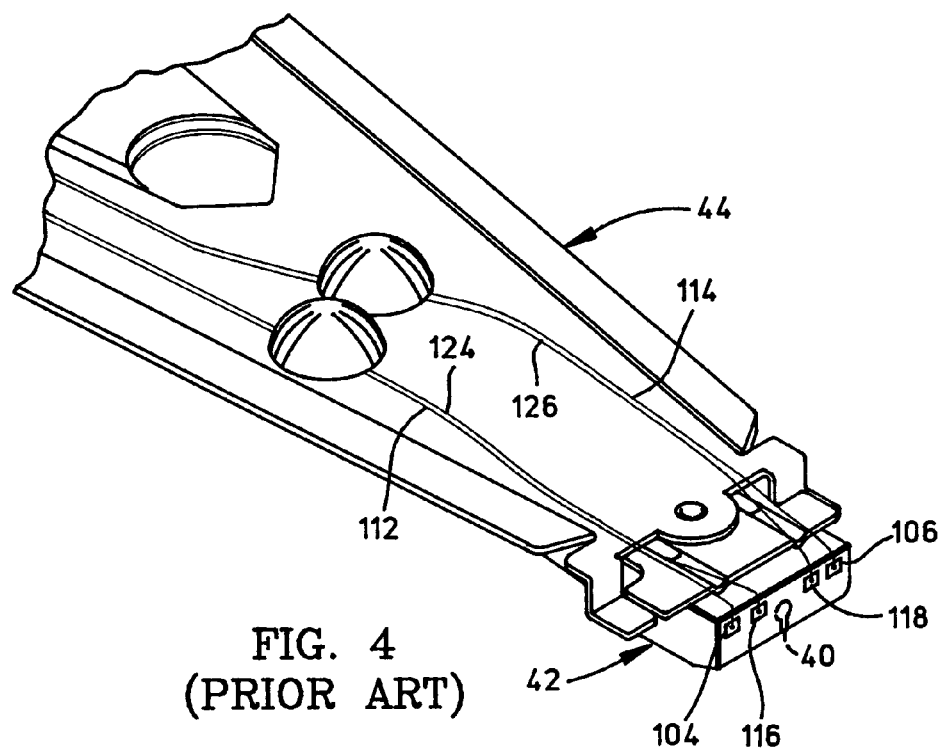
FIG. 4 is an isometric illustration of an exemplary prior art suspension system for supporting the slider and magnetic head assembly.

Referring now to the drawings wherein like reference numerals designate like or similar parts throughout the several views, FIGS. 1–3 illustrate an exemplary magnetic disk drive 30. The drive 30 includes a spindle 32 that supports and rotates a magnetic disk 34. The spindle 32 is rotated by a spindle motor 36 that is controlled by a motor controller 38. A slider 42 carries a magnetic head assembly 40 and is supported by a suspension 44 and actuator arm 46 that are rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head assembly 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the magnetic head assembly 40, provides spindle motor drive signals for rotating the magnetic disk 34, and provides control signals to the actuator 47 for moving the slider 42 to various tracks. In FIG. 4 the slider 42 is shown mounted to the suspension 44. The components described hereinabove may be mounted on a frame 54 within a housing 55, as shown in FIG. 3.

Figure 5:
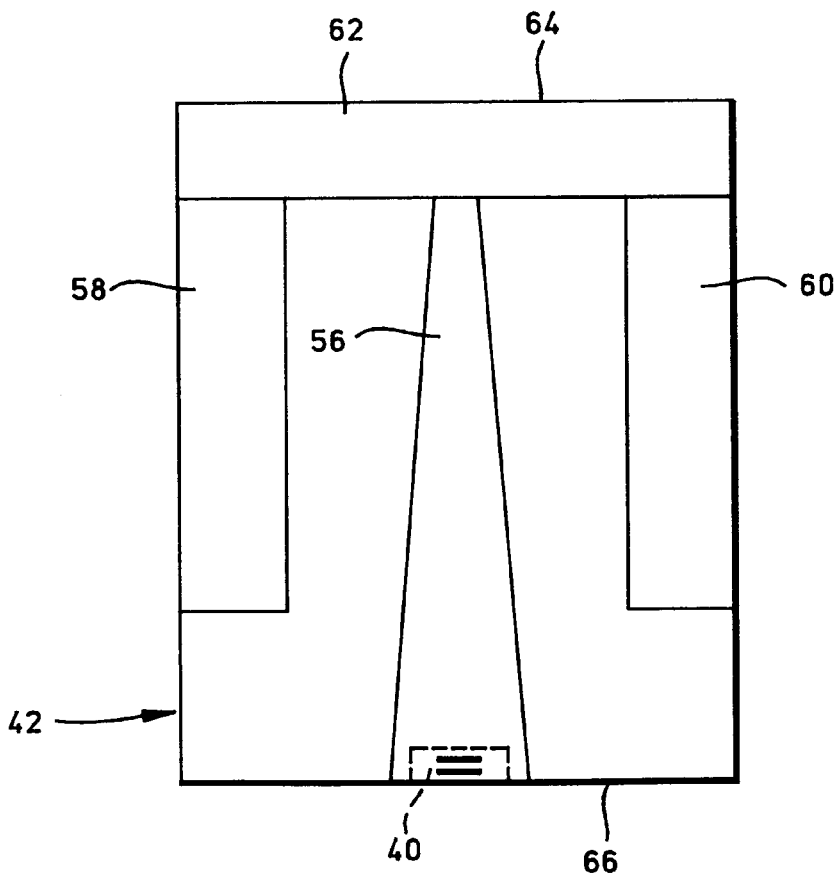
FIG. 5 is an ABS view of the magnetic head assembly taken along plane 5—5 of FIG. 2.

FIG. 5 is an exemplary ABS view of the slider 42 and the magnetic head assembly 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
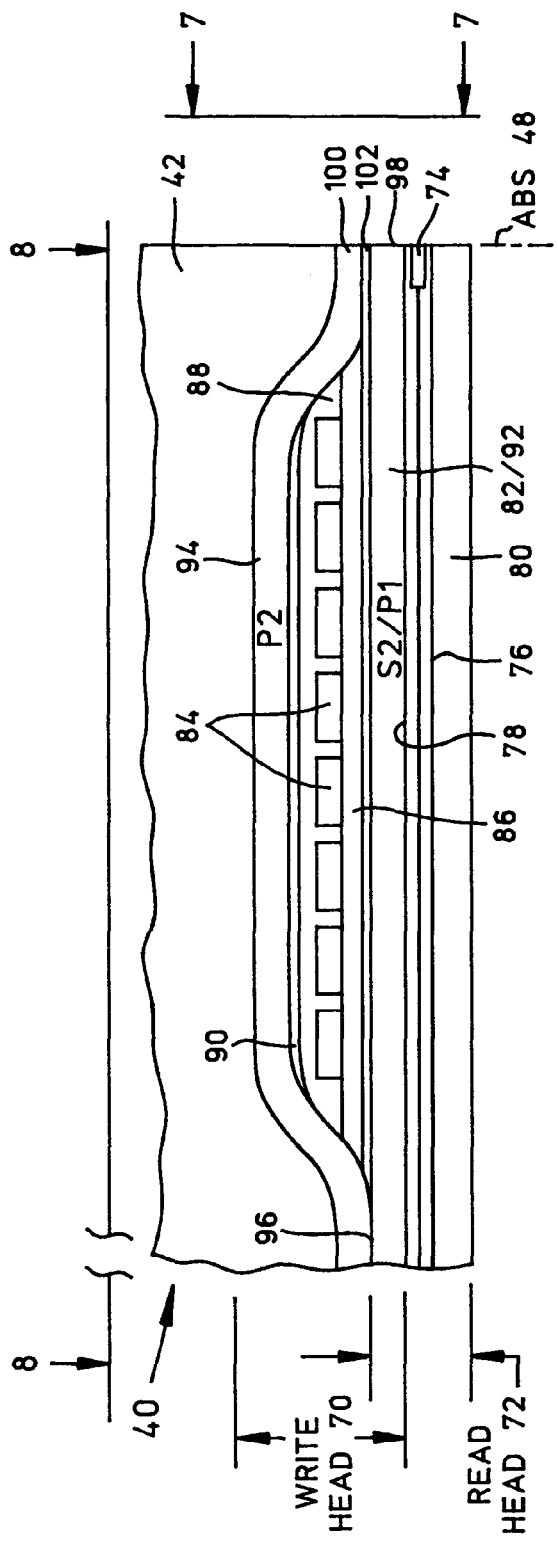
FIG. 6 is a partial view of the slider and a merged magnetic head as seen in plane 6—6 of FIG. 2.
Figure 7:
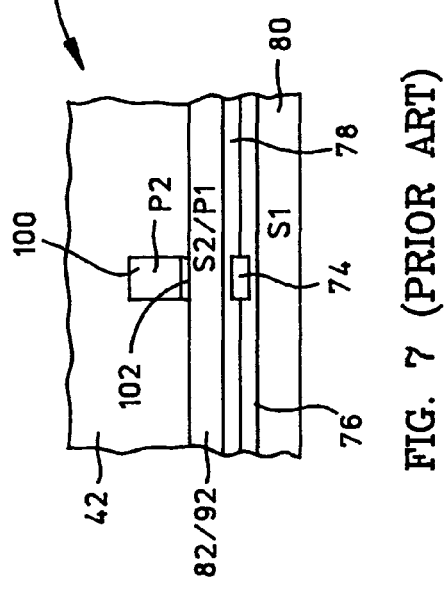
FIG. 7 is a partial ABS view of the slider taken along plane 7—7 of FIG. 6 to show the write and read heads of the magnetic head assembly.

FIG. 6 is a side cross-sectional elevation view of a merged magnetic head assembly 40, which includes a write head 70 and a read head 72, the read head employing a GMR read sensor 74. FIG. 7 is an ABS view of FIG. 6. The read sensor 74 is sandwiched between first and second nonmagnetic electrically insulative read gap layers 76 and 78 and the read gap layers are sandwiched between first and second ferromagnetic shield layers 80 and 82. In response to signal fields, the resistance of the read sensor 74 changes. A sense current $I_S$ conducted through the read sensor causes these resistance changes to be manifested as potential changes. These potential changes are then processed as readback signals by the processing circuitry 50 shown in FIG. 3.

Figure 8:
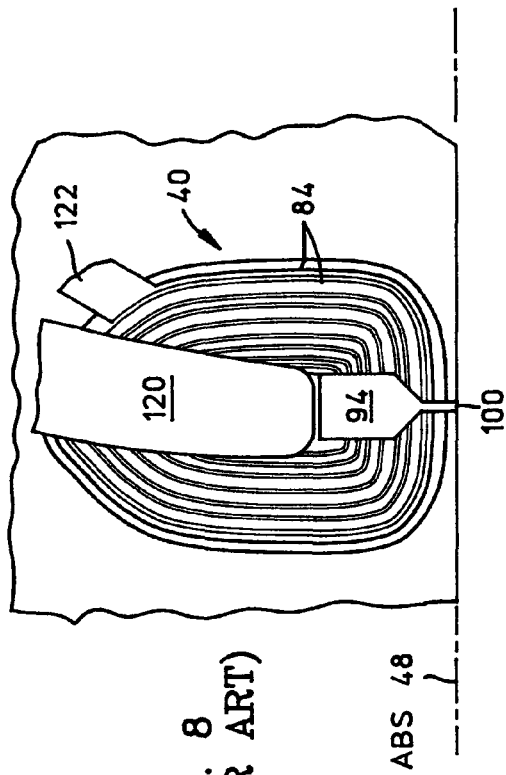
FIG. 8 is a view taken along plane 8—8 of FIG. 6 with all material above the coil layer and leads removed.

The write head 70 of the magnetic head assembly 40 includes a coil layer 84 which is sandwiched between first and second insulation layers 86 and 88. A third insulation layer 90 may be employed for planarizing the write head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second ferromagnetic pole piece layers 92 and 94. The first and second ferromagnetic pole piece layers 92 and 94 are magnetically coupled at a back gap 96 and have first and second pole tips 98 and 100 which are separated by a write gap layer 102 at the ABS. Since the second ferromagnetic shield layer 82 and the first ferromagnetic pole piece layer 92 are a common layer this head is known as a merged magnetic head assembly. In a piggyback head (not shown) the layers 82 and 92 are separate layers and are separated by an insulation layer. As shown in FIGS. 2 and 4, first and second solder connections 104 and 106 connect leads from the read sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
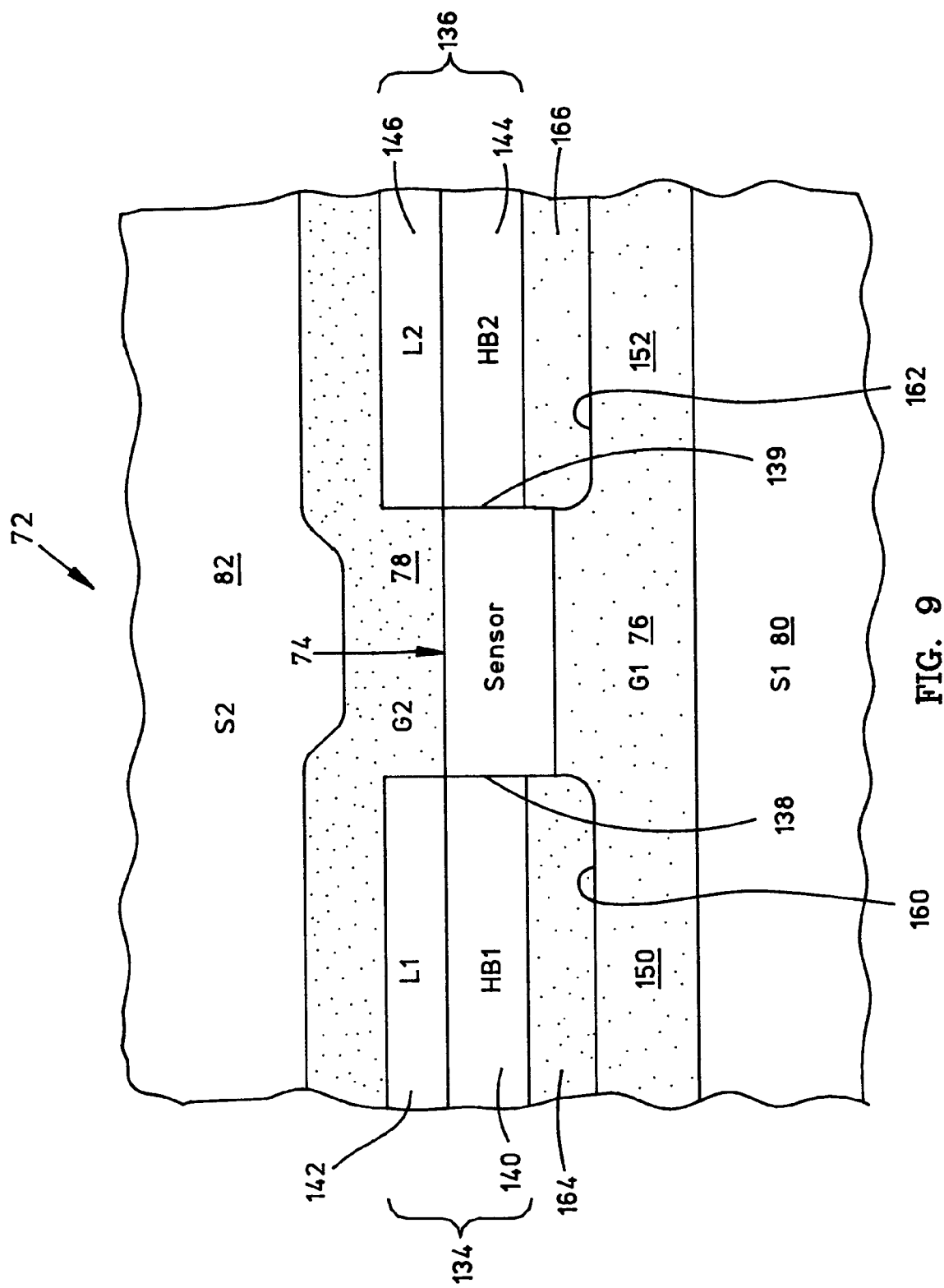
FIG. 9 is an enlarged ABS illustration of the present read head with a GMR read sensor.

FIG. 9 is an enlarged ABS illustration of the present read head 72 wherein the read head 72 includes the sensor 74. First and second hard bias and lead layers 134 and 136 are typically connected to first and second side walls or surfaces 138 and 139 of the sensor 74. This connection is known in the art as a contiguous junction as referred to hereinabove. The first hard bias and lead layers 134 include a first hard bias (HB1) layer 140 and a first lead layer (L1) 142. The second hard bias and lead layers 136 include a second hard bias layer (HB2) 144 and a second lead layer (L2) 146. The hard bias layers 140 and 144 produce a longitudinal bias field to stabilize the free layer of the sensor 74 in a single magnetic domain state. The sensor 74 and the first and second hard bias and lead layers 134 and 136 are located between the nonmagnetic electrically insulating first and second read gap layers 76 and 78. The first and second read gap layers 76 and 78 are, in turn, located between the first and second ferromagnetic shield layers 80 and 82.

First and second read gap material layers 150 and 152 have first and second depressions 160 and 162 which extend laterally from the first and second side walls 138 and 139 and nonmagnetic electrically insulative first and second refill gap layers 164 and 166 which are disposed in the first and second depressions. A suitable material for the first gap layer 76, the first and second read gap material layers 150 and 152 and the first and second refill gap layers 164 and 166 is aluminum oxide ($Al_2O_3$). The first refill gap layers 164 and 166 are not located on a portion of the first and second side walls 138 and 139 so that the first and second hard bias and lead layers 134 and 136 make direct electrical contact with the sensor 74.

The Present Method

FIGS. 10–16 illustrate the present method of making the read head 72 shown in FIG. 9. In FIG. 10, after forming the first shield layer 80, a first read gap material layer 170 is sputter deposited on the first shield layer. A sensor material layer 74, which has all of the desired films for the sensor, is then sputter deposited on the read gap material layer 170, a carbon layer (C) 172 is sputter deposited on the sensor material layer 72 and a photoresist mask 200 with a desired track width (TW) is formed on the carbon layer 172.

In FIG. 11 reactive ion etching (RIE) is implemented which removes exposed portions of the carbon layer 172 and then ion milling is implemented which removes the sensor material layer 72 so as to form the sensor 74 with first and second side walls 138 and 139. The ion milling is continued, which is known in the art as overmilling, into the read gap material layer 170 so as to form the read gap G1 76 and the first and second read gap material layers 150 and 152 with first and second depressions 160 and 162. This overmilling is necessary in order to ensure the complete removal of the sensor material layer portions which extend laterally from the first and second side walls 138 and 139. In FIG. 12 a layer of alumina 202 is sputter deposited globally which fills in the depressions 160 and 162 as well as covering the first and second side walls 138 and 139 of the sensor. An aspect of the invention is to sputter deposit the alumina until the alumina fills in to a level in each of the depressions 160 and 162 to reduce shield shorts.

In FIG. 13 ion milling is commenced at a high angle to a normal to the substrate or major horizontal plane of the first shield layer 80 within a range of 45°–85°, such as 70°. While the ion milling is maintained at a constant angle the structure shown in FIG. 13 is rotated which results in the ion milling of the side walls to be cyclic. In FIG. 14 the ion milling has been continued until the alumina has been removed from at least a portion of the first and second side walls 138 and 139 so that these side walls are exposed for a subsequent electrical connection thereto. During the ion milling the alumina above the depressions 160 and 162 has also been milled. An aspect of the invention is that the alumina layer sputter deposited in FIG. 12 be sufficiently thick so that when the alumina is ion milled from the side walls 138 and 139 the top surfaces of the refill gap layers 164 and 166 provide a sufficient thickness to minimize shield shorts from the first shield layer 80 to the first and second hard bias and lead layers 134 and 136 in FIG. 9.

In FIG. 15, a seed layer for texture purposes (not shown), the first and second hard bias layers 140 and 144, the first and second lead layers 142 and 146 and a carbon layer 174 may be sputter deposited on the first and second refill layers 164 and 166 and on the first and second side walls 138 and 139. In FIG. 16 chemical mechanical polishing (CMP) has removed the top portion of the carbon layer 174 above photo mask 200, vertical portions of the layers 174, 146 and 144, the photo mask 200 and is stopped by the carbon layer 172, and then reactive ion etching (RIE) removes the carbon layer 172 on top of the sensor 74. The result is a contiguous junction between the first and second side walls 138 and 139 and the first and second hard bias and lead layers 134 and 136 with a good electrical connection therebetween. The second read gap layer 78 and the second shield layer 82 are then formed, as shown in FIG. 9.

Discussion

The read head may be employed in a magnetic disk drive as described hereinabove or in a tape drive wherein a head surface faces a moving magnetic tape instead of a rotating magnetic disk. The photomask 200 may be a bilayer photoresist which is well-known in the art. The materials described herein are exemplary and other materials may be substituted therefore provided the required electrical and insulative functions are fulfilled. The milling steps hereinabove may be ion milling or any milling steps in the art for removing material.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head that has a head surface comprising:
    a read sensor that forms a portion of said head surface and has first and second side walls which extend into the read head from said head surface;
    nonmagnetic electrically insulative first and second read gap layers wherein the first read gap layer includes a read gap material layer and first and second refill gap layers;
    the read sensor being located between the first and second read gap layers;
    the read gap material layer having first and second depressions which extend laterally from the first and second side walls respectively of the sensor;
    the first and second refill gap layers being disposed in the first and second depressions and engaging a bottom portion of the first side wall and engaging a bottom portion of the second side wall respectively;
    the first read gap layer having first and second portions which extend laterally from the first and second side walls of the sensor and a third portion which engages a bottom surface of the sensor and is located between said first and second portions;
    each of said first and second portions having a thickness which is greater than a thickness of said third portion;
    first and second hard bias layers interfacing the first and second refill gap layers respectively and the top portion of the first and second side walls respectively;
    said first and second lead layers interfacing the first and second hard bias layers respectively;
    each of the first and second hard bias layers and the sensor having a top surface;
    the top surfaces of the first and second hard bias layers and the sensor lying within a common plane;
    a first lead layer electrically connected to a top portion of the first side wall and a second lead layer electrically connected to a top portion of the second side wall;
    a ferromagnetic first shield layer;
    the first read gap layer interfacing the first shield layer;
    the second read gap layer interfacing the sensor; and
    a ferromagnetic second shield layer interfacing the second read gap layer.

2. A magnetic head assembly that has a head surface comprising:
    a write head;
    a read head adjacent the write head comprising:
        a read sensor that forms a portion of said head surface and that has first and second side walls which extend into the read head from said head surface;
        nonmagnetic electrically insulative first and second read gap layers wherein the first read gap layer includes a read gap material layer and first and second refill gap layers;
        the read sensor being located between the first and second read gap layers;
        the first read gap material layer having first and second depressions which extend laterally from the first and second side walls respectively of the sensor;
        the first and second refill gap layers being disposed in the first and second depressions and engaging a bottom portion of the first side wall and engaging a bottom portion of the second side wall respectively;
        the first read gap layer having first and second portions which extend laterally from the first and second side walls of the sensor and a third portion which is between the first and second portions and is located between the sensor and the first shield layer;
        each of said first and second portions having a thickness which is greater than a thickness of said third portion;
        first and second hard bias layers interfacing the first and second refill gap layers respectively and the top portion of the first and second side walls respectively;
        said first and second lead layers interfacing the first and second hard bias layers respectively;
        each of the first and second hard bias layers and the sensor having a top surface;
        the top surfaces of the first and second hard bias layers and the sensor lying within a common plane;
        a first lead layer electrically connected to a top portion of the first side wall and a second lead layer electrically connected to a top portion of the second side wall;
        a ferromagnetic first shield layer;
        the first read gap layer interfacing the first shield layer;
        the second read gap layer interfacing the sensor; and
        a ferromagnetic second shield layer interfacing the second read gap layer.

3. A magnetic disk drive comprising:
    at least one magnetic head assembly that has a head surface;
    the magnetic head assembly having a write head and a read head;
    the read head including:
        a read sensor that forms a portion of said head surface and has first and second side walls which extend into the read head from said head surface;
        nonmagnetic electrically insulative first and second read gap layers wherein the first read gap layer includes a read gap material layer and first and second refill gap layers;
        the read sensor being located between the first and second read gap layers;
        the read gap material layer having first and second depressions which extend laterally from the first and second side walls respectively of the sensor;
        the first and second refill gap layers being disposed in the first and second depressions and engaging a bottom portion of the first side wall and engaging a bottom portion of the second side wall respectively;
        the first read gap layer having first and second portions which extend laterally from the first and second side walls of the sensor and a third portion which is between the first and second portions and is located between the sensor and the first shield layer;
        each of said first and second portions having a thickness which is greater than a thickness of said third portion;
        first and second hard bias layers interfacing the first and second refill gap layers respectively and the top portion of the first and second side walls respectively;
        said first and second lead layers interfacing the first and second hard bias layers respectively;
        each of the first and second hard bias layers and the sensor having a top surface;

the top surfaces of the first and second hard bias layers and the sensor lying within a common plane;
a first lead layer electrically connected to a top portion of the first side wall and a second lead layer electrically connected to a top portion of the second side wall;
a ferromagnetic first shield layer;
the first read gap layer interfacing the first shield layer;
the second read gap layer interfacing the sensor; and
a ferromagnetic second shield layer interfacing the second read gap layer;
a housing;
a magnetic medium supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

* * * * *